Dec. 17, 1957   M. MIKLOSEK   2,816,404
CAR COUPLING APPARATUS
Filed Feb. 24, 1955
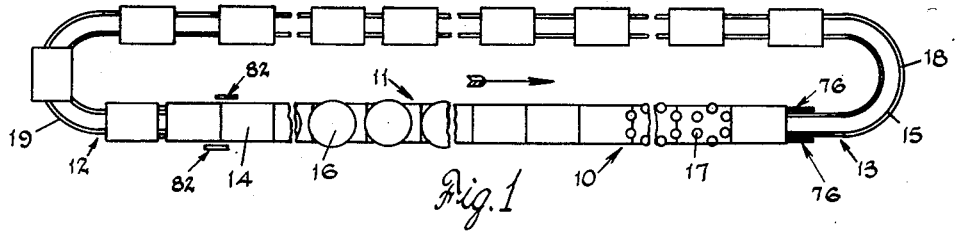
Fig. 1
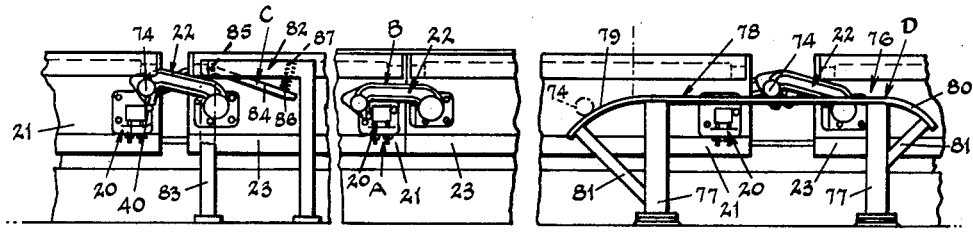
Fig. 2
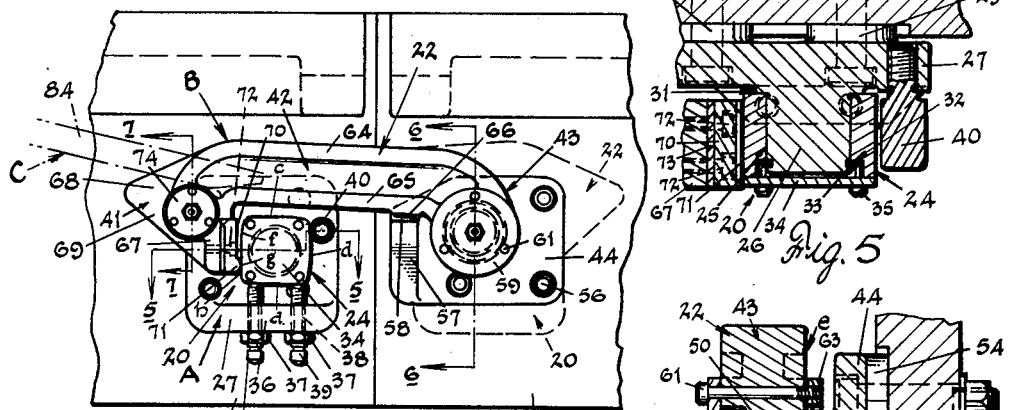
Fig. 3
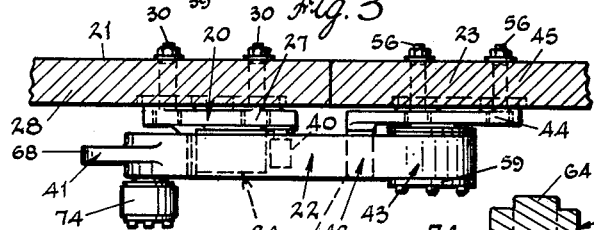
Fig. 4
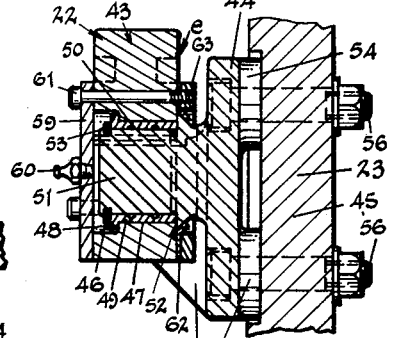
Fig. 7
Fig. 5
Fig. 6
INVENTOR.
Martin Miklosek
BY
Nobbe & Swope
ATTORNEYS United States Patent Office 2,816,404
Patented Dec. 17, 1957

2,816,404

CAR COUPLING APPARATUS

Martin Miklosek, Toledo, Ohio, assignor to Libbey-Owens-Ford Glass Company, Toledo, Ohio, a corporation of Ohio Application February 24, 1955, Serial No. 490,324

5 Claims. (Cl. 51—240)

This invention relates generally to the grinding and polishing of glass sheets or plates, and more particularly to improved coupling apparatus for joining adjacent cars or work tables upon which glass blanks to be surfaced are supported.

In the so-called continuous method of grinding and polishing plate glass blanks, a plurality of rough glass blanks are mounted upon a series of cars or tables arranged in end-to-end relation and movable continuously along a definite predetermined path to carry the glass blanks first through a grinding, and then through a polishing area. In mounting the glass blanks, the upper surface of the work table is sprayed with a layer of plaster and the glass blanks then bedded while the plaster is still wet. Because of the size of the blanks and the spacing thereof on the work tables, a given blank may be supported by two adjacent tables. It is obvious, therefore, that the tables must be rigidly joined together so as to present a continuous surface upon which the blanks may be bedded.

Since most continuous systems of grinding and polishing have the work tables mounted on a continuous track having a straight-run work portion and a straight-run return portion, connected by circular end portions, it is also preferable that table coupling apparatus be provided that may be quickly actuated so as to disengage the tables from one another when it is necessary that they travel the curved track portion between the work and the return run, and then re-engage the tables when they reach the portion of the system wherein the glass blanks are mounted for surfacing.

An important object of this invention is to provide a car or work table coupling apparatus of improved construction and design.

Another object is to provide means coacting with such coupling apparatus for automatically coupling and uncoupling adjacent work tables.

A further object of the invention is to provide improved coupling apparatus where in the parts subjected to wear may be easily and quickly replaced.

Other objects and advantages of the invention will become more apparent during the course of the following description when taken in connection with the accompanying drawings.

In the drawings, wherein like numerals are employed to designate like parts throughout the same:

Fig. 1 is a partial plan view of a continuous grinding and polishing system;

Fig. 2 is a fragmentary elevation of a series of work tables upon which glass blanks to be surfaced are mounted, illustrating the operation of the automatic coupling and uncoupling means;

Fig. 3 is an enlarged view of the adjacent ends of a pair of the work tables of Fig. 2 showing them joined together by the improved car coupling apparatus of the invention;

Fig. 4 is a plan view of the coupling apparatus shown in Fig. 3;

Fig. 5 is a fragmentary section taken along the line 5—5 of Fig. 3;

Fig. 6 is a fragmentary vertical section taken along the line 6—6 of Fig. 3; and Fig. 7 is a vertical section taken along the line 7—7 of Fig. 3.

Broadly stated, and as best seen in Fig. 2, the improved car coupling apparatus of the present invention includes a latch member A adapted to be secured to one end of a work table, a rotatable hook B adapted to be secured to the opposite end of an adjacent table which engages the latch member when the two are locked together in end-to-end relationship, a cam C mounted along the path of travel of the tables for urging the hook into locking engagement with the latch member, and another cam D mounted along the path of travel of the tables which disengages the rotatable hook member when it is desired to separate the tables from one another.

With reference again to the drawings, and particularly to Fig. 1, there is shown a well-known type of continuous grinding and polishing line generally indicated by the numeral 10. The entrance end to the straight run grinding and polishing portion 11 of the line is indicated at the left of the figure by the numeral 12, and the exit end indicated to the right by the numeral 13. In the straight run grinding and polishing portion, a series of work tables 14 are mounted upon a track 15 and locked together to form a continuous glass supporting surface on which glass blanks to be surfaced are bedded in a layer of plaster. The tables are continuously moved in the direction of the arrow to carry the blanks first beneath a series of grinding heads 16, and then beneath a series of polishing heads 17. As shown to the right of Fig. 1, the work tables are separated from one another after passing beneath the polishing heads and travel independently around the curved portion 18 of the track 15 upon which they are supported to the straight run return portion of the line. The work tables are rejoined to one another as at the left of the figure after passing around the curved track portion 19 and the glass sheets to be surfaced are then placed upon the tables before they are again passed beneath the grinding heads 16.

As shown in Figs. 2 and 3, the improved car coupling apparatus comprises a generally rectangular latch assembly 20 secured along the side of a work table 21 at the end thereof, and a rotatable hook 22 secured to the opposite end of an adjacent work table 23 and which is adapted to engage and be restrained by the latch assembly when the two tables are abutting one another. On the opposite side of the tables, and as shown in phantom lines in Fig. 3, the hook 22 is attached to the table 21, and the latch assembly is secured to the table 23 so that a reverse locking is effected. However, since the apparatus is identical on either side, a description will be given only of the apparatus shown secured to the near side of the tables.

The latch assembly 20 comprises a substantially rectangular hook engaging and restraining block 24 having an axial hole 25 formed therein for slidably receiving an outwardly extending circular boss 26 which forms a portion of a base plate 27 secured to the side wall 28 of the work table 21. The work table side wall 28 is notched inwardly opposite the base plate to partially receive a plurality of mounting pads 29 which are formed on the side of the base plate adjacent the work table 21 and through which are passed bolts 30 for securing the base plate to said side wall.

The hook engaging block 24 of the latch member has its inner end seated against a shoulder 31 formed about the periphery of the circular boss 26 and its opposite end notched inwardly from the axial hole 25 to form an inner shoulder 32 which bears against an annular snap ring 33 provided about the periphery of the boss 26 at the outer end thereof. Thus, the block 24 is free to rotate about the boss 26 but is restrained from outward movement thereon due to the inner shoulder 32 bearing against the snap ring 33. To prevent foreign matter from interfering with rotational movement of the block upon the protruding boss, a cover plate 34 closes the hole 25 and is secured to the block 24 by means of suitable cap screws 35.

The lower part of the base plate 27 has an outwardly extending horizontal portion 36 formed thereon to which, on the underside thereof, a pair of nuts 37 are rigidly fastened. Aligned holes 38 are formed in the portion 36 for receiving therethrough a pair of screws 39 which rotate within the nuts 37 and have their ends bearing against the lower surface a of the block 24 which has its three other surfaces b, c and d of exactly the same contour. Therefore, although the block 24 is free to rotate about the boss 26 when the block is in a given position, such movement is prevented by the screws 39. To the right of the block 24, as shown in Fig. 3, a circular lift stud 40, the purpose of which will be later described, is threaded into the base plate 27 and is located vertically with respect to the block 24 so as to have its upper surface somewhat below the upper surface c of said block.

The hook 22, which in effect forms the connection between the tables 21 and 23, is rotatably fastened at its one end to the table 23. The hook per se comprises a head portion 41, a shank portion 42, and a base portion 43 which is formed as a rounded hub and which is rotatably received by a base plate 44 secured to the side wall 45 of the table 23. The base portion 43 of the hook has a hole 46 formed therein which extends inwardly a limited distance and which communicates with a second axially aligned hole 47 of smaller diameter in such a manner as to form a shoulder 48. Against the shoulder, there is seated a bushing 49 which is received within the hole 47 and is provided with lubricant grooves 50 on its inner surface. The hook base portion is supported by a circular boss 51 similar to the boss 26 which is received within the bushing 49 and has a shoulder 52 formed thereon inwardly of the end thereof against which are seated both the base portion 43 and the bushing 49. Similarly to the boss 26, the boss 51 is provided at its outer end with an annular snap ring 53 which seats against the outer face of the bushing 49. This allows rotational movement of the hook about the boss 51 but prevents any outward movement thereof since the bushing, which is restrained by the snap ring, seats against the shoulder 48 of the hook base portion. The boss 51 forms an integral outward extension of the base plate 44 which is similar to the plate 27 and likewise provided with mounting pads 54 on its face adjacent the side wall 45 of the work table 23 which is notched inwardly to receive said mounting pads which are secured thereto by suitable bolts 56.

For a purpose to be later described, the base plate 44, on its side adjacent the work table 21, is provided with an outwardly extending triangular web 57 having its upper leg 58 disposed in a horizontal plane.

The hole 46 in the hook base portion 43 is sealed by means of a cover plate 59 which has a grease fitting 60 centrally located therein to provide a suitable entry port for introducing a lubricant to the grooves of the bushing 49 and which is secured against the hook base by a plurality of bolts 61. To prevent escape of the lubricant, an annular seal ring 62 is clamped against the inner face e of the base portion and extends over the joint formed between said base portion and the shoulder 52 of the boss 51. The seal ring is held in place by an annular clamping ring 63 which is clamped against the seal ring by the same bolts 61 used to secure the cover plate in place and which have their ends threadably received in said clamping ring.

The shank portion 42 of the hook 22 is shaped substantially as an I-beam having an upper flange 64 and a lower flange 65 which has a depending lip 66 formed thereon adjacent the base portion and which, as later described, seats against the upper leg 58 of the web 57. At the outer end of the shank portion, both the upper and lower flanges 64 and 65 thereof curve downwardly to join with one another and form a vertical flange 67. On the forward face of the vertical flange 67 and extending upwardly to the upper flange 64, there is formed a triangularly shaped plate 68 the lower leg 69 of which, as later described, is guided upwardly by the lift stud 40 immediately before the two tables abut one another. On the opposite face of the vertical flange 67, there is provided a removable rub plate 70 which is substantially rectangular in shape and has a circular nub 71 provided on its lower end for engagement, as seen in Fig. 3, with the surface b of the block 24. The rub plate is removably secured to the flange 67 by means of one or more cap screws 72. To provide for spacing adjustment of the rub plate with respect to the flange 67, a shim 73 is provided therebetween which comprises a plurality of thin plastic laminations which may be peeled from one another to reduce the thickness of the shim.

Substantially midway between the lower end of the vertical flange 67 and the apex of the triangular plate 68, there is provided an outwardly extending wheel or cam follower 74 having suitable bearings provided therewithin and rotatably mounted on an axle 75 which is threadably received within the upper flange 64 substantially at its joinder point with the lower flange 65. As later described, when the tables have passed beneath the polishing heads and are to be separated from one another before traveling the track end portion 18, the follower engages a cam D of such a shape as to exert an upward thrust thereon thereby disengaging the hook from the latch assembly 20 and releasing the work tables from one another. When the tables have rounded the track end portion 19 and are abutting one another, the cam follower is acted upon by another cam C of such a shape as to exert a downward thrust on the follower which in turn urges the hook into restraining contact with the latch assembly and thus locks the tables to one another.

The cam D comprises a cam structure 76, provided on each side of the track and in the path of travel of the work tables and which, as previously mentioned, urges the follower 74 upwardly and thus disengages the head portion 41 of the rotatable hook 19 from the latch assembly 20. As seen in Fig. 2, the cam structure 76 comprises a pair of uprights 77 suitably secured to the building floor upon which the track is mounted. Supported on the upper ends of the uprights is a cam rail 78 which is substantially horizontal between said uprights and which curves downwardly at each end outwardly of the uprights to form end rail portions 79 and 80. To provide adequate vertical support for the end rail portions, suitable braces 81 extend downwardly therefrom and bear against the uprights.

The cam C includes a cam structure 82 which is provided on each side of the track and which engages the cam follower 74 and urges said follower downwardly so that the hook is restrained by and locked to the latch assembly. As seen in Fig. 2, the cam structure 82 comprises a support frame 83 in the form of an inverted U which has pivotally fastened thereto a lever 84. The lever is angled downwardly in the direction of movement of the tables and has its upper end pivotally joined to the frame as at 85. A spring 86, which compressibly resists upward movement of the lever, has its lower end engaging the lever inwardly of the free end thereof and its opposite end seated against the frame as at 87.

To the left of Fig. 2, the work tables 21 and 23 are shown immediately prior to engagement with one another and, as there shown, the lower leg 69 of the triangular head of the rotatable hook has engaged the lift stud 40 and is elevated to such a position that upon further movement of the tables towards one another the vertical flange 67 of the head portion will ride over the surface c of the block 24. When the tables are abutting one another, as shown in Fig. 3, the nub 71 of the rub plate will have cleared the junction point of the surfaces b and c on the block 24 and will then drop downwardly due to gravity along the surface b until the portion 66 of the hook contacts the horizontal leg 58 of the web 57 at which time the rub plate is properly positioned on the block 24 and the two tables are locked to one another.

It is oftentimes the case, that the hook does not drop a sufficient distance to enable the nub 71 of the hook rub plate to properly and fully engage the block 24. As shown in Fig. 3, the surface b, similarly to the other three hook engaging surfaces of the block 24, comprises two converging portions f and g. When the block 24 is properly oriented on the boss 26, the portion f of the surface b is inclined to the vertical while the portion g is substantially vertical. The angle of the portion f allows the nub 71 to drop freely over this portion until it contacts the vertical portion g. At this point, force applied to the hook is helpful in properly seating the nub 71 against the block 24. Therefore, as the follower wheel 74 arrives opposite the cam structure 82, the lever 84 engages the upper surface of the follower which is then urged downwardly due to the angle of said lever and the resistance of the spring 86. This downward movement of the follower properly seats the hook and, when so seated, the resistance thereof to further downward movement urges the lever upwardly to allow passage of the follower thereunder. After the follower passes, the spring 86 returns the lever to its normal position.

Although not shown, it will be understood that the tables 14 are moved along the track 15 by means of a suitable drive system adapted to move each of the work tables independently of the others and that the momentum of each table when being joined to a preceding table, as at the portion of the track indicated by the numeral 12, prior to the glass blanks being bedded thereon, is sufficient to lift the hook 22 upwardly through engagement with the lift stud 40 so that it may drop down when the tables abut one another and engage the block 24.

When the joined tables have passed the polishing heads 16 and are approaching the circular portion of the track 18 to the right of the system shown in Fig. 1, the follower wheel 74, which is shown in dotted lines in the segment of Fig. 2 to the right of the drawing, engages the downwardly curved end portion 79 of the cam rail 78. Upon further forward movement of the table, the follower rides upwardly along the end portion of the cam rail and becomes disengaged from the block 24. The table 23, which is now freed from contact with the following tables, will advance somewhat more rapidly due to the nature of the drive system which motivates the tables and, as the follower travels down the opposite end portion 80 of the cam rail, the hook 22 will drop downwardly and be supported by the outwardly extending web 57 of the base plate 44. This places the hook 22 in substantially the position shown in Fig. 3 so that when the table is again joined with an adjacent table, the hook is properly positioned to engage a lift stud carried by said adjacent table.

It will be understood that close tolerances must be maintained between the surface b of the block 24 and the nub 71 of the hook rub plate 72. This is important because, as previously mentioned, of the necessity of maintaining the work tables in tight contact with one another so as to present a continuous surface upon which glass blanks may be bedded. Since repeated engagement and disengagement of the nub 71 with the block 24 leads to a gradual wearing away of the metal of both the plate and the block, the fit therebetween tends to become looser with repeated engagement and disengagement therebetween. To overcome this difficulty and assuming, as shown in Fig. 3, that the surface b of the block 24 has become somewhat worn, it is only necessary to retract the screws 39 and then rotate the block 24, for example clockwise, to place the surface a in the position formerly occupied by surface b and exposed to the wearing action of the rub plate. The rub plate may also be replaced by simply removing the screws 72 which secure it to the vertical flange 67 and then replacing the worn hub plate with a new member. Thus, the novel design of the coupling apparatus enables those portions subjected to wear to be quickly and easily replaced and such replacement is effected with a minimum of effort and shut-down time. In fact, the system need not be shut down for such replacement since this could be carried out while the work tables are moving about the portions of the track wherein they are separated from one another.

From the foregoing discussion, it will be seen that the improved car coupling apparatus herein disclosed is fully automatic in operation, provides a positive lock between adjacent work tables, and yet is easily actuated both to engage and disengage adjacent work tables when it becomes necessary to do so.

It is to be understood that the form of the invention herewith shown and described is to be taken as a preferred embodiment of the same, and various changes may be resorted to without departing from the spirit of the invention or the scope of the subjoined claims.

I claim:

1. In apparatus for surfacing glass sheets including a pair of work tables arranged in movable end-to-end relationship with one another, a hook pivotally mounted on the end of one table for movement in a vertical plane, and a latch assembly associated with the adjacent end of the other table for engaging and retaining said hook when the two tables abut one another, said latch assembly including a hook retaining member located in substantially the same vertical plane in which the hook moves and rotatably mounted on said latch assembly having a plurality of hook engaging surfaces formed thereon, and locking means for fixing said hook retaining member in any one of a plurality of positions so as to present any one of said plurality of surfaces for engagement with said hook.

2. In apparatus for surfacing glass sheets as defined in claim 1, wherein the latch assembly includes a fixed support, and the hook retaining member is rotatably mounted on said support and has the hook engaging surfaces thereof in the plane of movement of the hook.

3. In apparatus for surfacing glass sheets as defined in claim 1, wherein the locking means comprises a movable member adapted to exert force against one of the surfaces of the hook retaining member in a plane parallel to the plane in which said hook retaining member is rotatably mounted.

4. In apparatus for surfacing glass sheets as defined in claim 1, wherein means is provided on the table to which the hook is secured for engaging and positioning said hook in a predetermined position when the tables are separated from one another, and guide means provided on the other table for displacing the hook out of said position and into contact with the hook retaining member.

5. In apparatus for surfacing glass sheets as defined in claim 4, wherein the hook has a surface thereof disposed at an angle to the horizontal when said hook is in the predetermined position, and the guide means comprises a fixed member located adjacent the hook retaining member and between said member and the hook as the tables approach one another and which engages the angled surface and guides it upwardly over said retaining member.

References Cited in the file of this patent

UNITED STATES PATENTS

| | | |
|---|---|---|
| 1,679,472 | Hitchcock | Aug. 7, 1928 |
| 1,854,484 | Pedersen | Apr. 19, 1932 |
| 1,901,511 | Handy | Mar. 14, 1933 |
| 1,913,994 | Price | June 13, 1933 |
| 2,068,068 | Owen | Jan. 19, 1937 |